(12) United States Patent
Gnuschke

(10) Patent No.: US 7,623,852 B2
(45) Date of Patent: Nov. 24, 2009

(54) REMOTE PROGRAMMING/ACTIVATION OF SIM ENABLED ATA DEVICE

(75) Inventor: Jerald J. Gnuschke, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 484 days.

(21) Appl. No.: 10/989,710

(22) Filed: Nov. 15, 2004

(65) Prior Publication Data

US 2006/0105810 A1   May 18, 2006

(51) Int. Cl.
    *H04M 3/00* (2006.01)
(52) U.S. Cl. .................. 455/419; 455/418; 455/410; 455/411; 455/425
(58) Field of Classification Search .............. 455/411, 455/426.2, 466, 552, 558, 554.2, 349, 418, 455/419, 425, 550.1, 52; 370/352
    See application file for complete search history.

(56) References Cited

U.S. PATENT DOCUMENTS

| | | | |
|---|---|---|---|
| 6,285,869 B1 * | 9/2001 | Shannon et al. ............. | 455/411 |
| 6,374,110 B1 | 4/2002 | Parker et al. | |
| 6,668,176 B1 * | 12/2003 | Koski et al. ............. | 455/552.1 |
| 6,799,155 B1 * | 9/2004 | Lindemann et al. ........... | 703/24 |
| 2004/0025047 A1 * | 2/2004 | Mayne et al. ............. | 713/200 |
| 2004/0153667 A1 * | 8/2004 | Kastelewicz et al. ........ | 713/201 |
| 2005/0132075 A1 * | 6/2005 | Creamer et al. ............. | 709/229 |
| 2006/0050688 A1 * | 3/2006 | Panagopoulos et al. ..... | 370/356 |
| 2006/0291455 A1 * | 12/2006 | Katz et al. .................. | 370/355 |

FOREIGN PATENT DOCUMENTS

| | | |
|---|---|---|
| DE | 101 28 948 A1 | 1/2003 |
| EP | 0 830 042 A2 | 3/1998 |
| EP | 0 923 258 A2 | 6/1999 |
| EP | 1 223 768 A1 | 7/2002 |
| EP | 1 432 257 A1 | 6/2004 |
| WO | WO 03/077585 A1 | 9/2003 |

OTHER PUBLICATIONS

International Search Report dated Aug. 29, 2005 for International Patent Application Serial No. PCT/US2004/038193, 7 pages.

* cited by examiner

*Primary Examiner*—Joesph H Feild
*Assistant Examiner*—Huy D Nguyen

(57) ABSTRACT

Systems and methods for programming and/or activating a subscriber identity module (SIM) enabled analog telephone adapter (ATA) device. A component activates and/or programs a SIM-enabled ATA module. Additionally, a component is provided that communicates with a network, such that the activation/programming component enables functionality of the SIM-ATA device by programming and/or activating the SIM-enabled module via the network. Separate components can effectuate activating and programming the SIM-ATA module.

23 Claims, 15 Drawing Sheets

REMOTE PROGRAMMING/ACTIVATION OF SIM ENABLED ATA DEVICE

TECHNICAL FIELD

This invention is related to providing local wireless communications to a subscriber's home and/or business, and more specifically, to systems and methods for programming and/or activating subscriber identity modules utilized in connection with devices that enable such wireless communications.

BACKGROUND OF THE INVENTION

Mobile telephone systems include a variety of services and functions beyond simple direct voice communication. Once scarce and expensive, mobile communication devices are now so common that most people own at least one. Mobile phones allow users to communicate from virtually anywhere.

Many cellular systems today comprise either a subscriber identity module (a "SIM" card) or a universal SIM (a "U/SIM" card) that is used for authenticating cellular subscription, services, billing, as well as other purposes. These technologies are denoted collectively as U/SIM. The U/SIM card is typically in a form factor that is removable by the user, which can make it possible to carry mobile subscription information and data through different types and generations of mobile communication devices (e.g., cellular phones).

The U/SIM card contains a microchip that houses a microprocessor and a memory. The card stores a mathematical algorithm that encrypts voice and data transmissions, which makes it nearly impossible to "listen in" on calls. The U/SIM also identifies the user to the mobile network as a legitimate caller. The interfaces between the mobile handset and the U/SIM card are fully standardized, and there are already specifications in place for third generation handsets and U/SIMs.

In addition to being employed with a mobile communication device, the U/SIM card can be utilized in connection with an analog telephone adapter (ATA), which can couple a telephone to a cellular network via Voice over IP (VoIP). SIM-enabled ATA devices (hereinafter referred to as SIM-ATA) generally require a SIM that is programmed with the customer subscription information. SIM-ATA devices can be employed in the subscriber's home and/or office and can be useful when cell coverage does not extend into a potential area of use or fails to provide adequate signal strength.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention disclosed and claimed herein, in one aspect thereof, is related to systems and methods for programming and/or activating a subscriber identity module (SIM) enabled analog telephone adapter (ATA) device. More particularly, a component that activates and/or programs a SIM-enabled ATA module is provided. Additionally, a component that communicates with a network is provided, such that the activation/programming component can enable functionality of the SIM-ATA device by programming and/or activating the SIM enabled module via the network. According to an aspect of the subject invention, separate components can effectuate activating and programming the SIM-ATA module.

In another aspect of the subject invention, architecture is provided for activating a SIM-ATA device by connecting wirelessly to a global communications network such as the Internet.

In yet another aspect of the subject invention, the SIM-ATA device is activated and/or programmed using a token. While the subscriber mobile device (e.g., cellular phone) is connected to the cellular network, it obtains a token from the cellular network. The mobile device can transmit the token via short-range RF to the SIM-ATA device (and/or vice versa). The SIM-ATA device uses the token to request activation and/or programming via the Internet. The cellular network can recognize the token for a limited time period, since the token can be configured to have a limited validity period. After the period expires, the token is invalid and the SIM-ATA will not be activated.

In still another aspect thereof, where the mobile device provides two (or more than two) SIM sockets, the SIM-ATA module can be inserted into an empty SIM socket of the mobile device. Software in the mobile device and/or cellular network can program the SIM-ATA module while it is in the phone. This avoids the problem of including SIM-write circuitry in the SIM-ATA device. Short-range RF can be employed to extract information from the ATA device, such as IP address.

In another aspect of the subject invention, where the phone includes a single SIM socket, an already-activated SIM can be removed from the phone, and the SIM-ATA module inserted. The module can be programmed and/or activated in a manner similar to the process for the SIM of the mobile device. The SIM-ATA module can then be removed from the mobile device and inserted into the SIM-ATA device.

In another aspect thereof, the SIM-ATA device can be utilized to finish the activation process subsequent to the SIM-ATA module being coupled to the SIM socket by reporting additional information to the cellular network after it is programmed into the SIM-ATA module. For example, the device IP address can be transmitted, as well as, the SIM-ATA equipment number.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
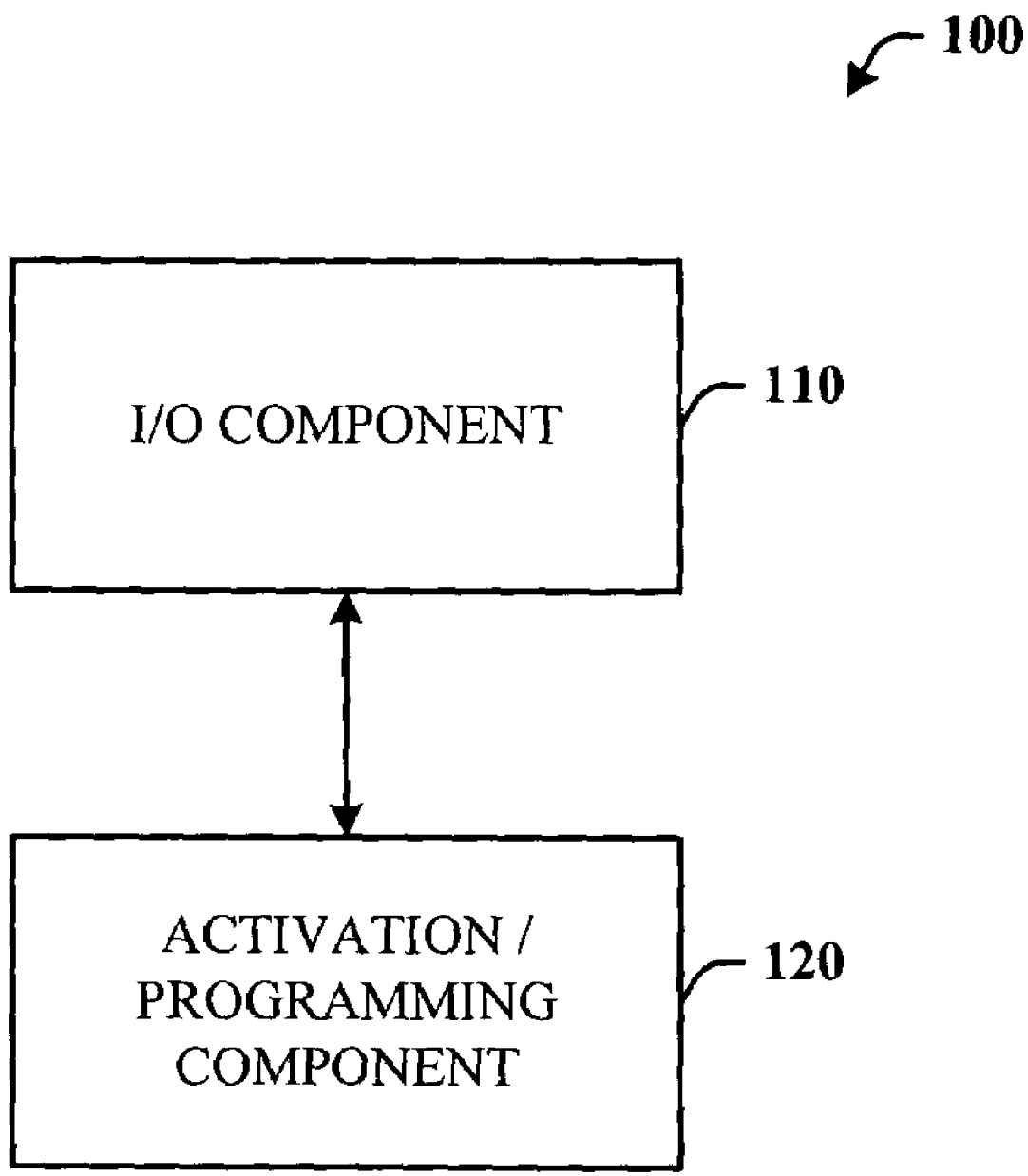
FIG. 1 illustrates a block diagram of a system that activates and/or programs a SIM utilized in connection with a SIM enabled ATA device according to an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running in a mobile computing device and the mobile computing device can be a component. One or more components may reside within a process and/or thread of execution and a component may be localized on one computer and/or distributed between two or more computers.

Referring now to FIG. 1, illustrated is a system 100 for activating and/or programming a subscriber identity module (SIM) (e.g., SIM, U/SIM, . . . ) utilized in connection with a SIM enabled analog telephone adapter (ATA) device (hereinafter referred to as SIM-ATA). The system 100 comprises an input/output (I/O) component 110 and an activation/programming component 120. The I/O component 110 receives and/or transmits data related to activating and/or programming of the SIM employed with the SIM-ATA (e.g., SIM-ATA module). The activation/programming component 120 can activate and/or program a device such as a SIM-ATA module.

The data received and/or transmitted by the I/O component 110 can be, for example, a token, a user name, a phone number, a unique identification number, an account number, an IP address, an equipment number, instructions, ring tones, skins, phonebook information, address book information, other data, etc. The I/O component 110 can receive the data automatically such that receipt of the data wakes up the activation/programming component 120. According to another aspect of the subject invention, the I/O component 110 can send out a signal and wait for data to be sent back in response.

The data can be received from and transmitted to numerous sources. For example, the data can be obtained from or sent to a global communication network such as the Internet, a transmission tower, a cellular network, a satellite, a wide area network (WAN), a local area network (LAN), a wireless communications device (e.g., mobile device, cellular phone, laptop computer, handheld computer, PDA, . . . ), GPS device, other devices (e.g., SIM-ATA), a SIM (e.g., SIM-ATA module, U/SIM), a gateway, a cable modem, a DSL modem, a T1 connection, etc. The data can be transmitted or received via wired and/or wireless communication techniques. The subject invention contemplates the use of any wireless technology such as, for example, radio frequency (RF), infrared (IR), optical, Bluetooth, etc. In another example, hard wired technologies such as Ethernet (e.g., 10Base-T, 100Base-T (Fast Ethernet) and 1000Base-T (Gigabit Ethernet), Universal Serial Bus (USB), FireWire (IEEE 1394), traditional communication ports (e.g., serial and parallel), etc., can be employed. Additionally or alternatively, the I/O component 110 can be hardware that provides the data to or receives data from the activation/programming component 120 such as a bus, wire, wireless transceiver, etc.

According to an aspect of the subject invention, the data received by the I/O component 110 can be a packet that is encrypted, encoded, compressed, modulated, enclosed in an envelope, etc. Additionally, the data can be a digital and/or an analog signal. The I/O component 110 and/or the activation/programming component 120 can extract the data, add additional data, identify pertinent data, query a user and/or device, etc.

The data is conveyed by the I/O component 110 to the activation/programming component 120, which utilizes the data to activate and/or program a SIM that is utilized in connection with a SIM-ATA. The SIM card (e.g., SIM, U/SIM, . . . ) contains a microchip that houses a microprocessor and a memory. The card stores a mathematical algorithm that encrypts voice and data transmissions. Additionally, the SIM identifies the user to the mobile network as a legitimate caller. Thus, the activation/programming component 120 facilitates gathering and storing the customer's subscription information retained in the memory of the SIM. Additionally, the activation/programming component 120 can activate the SIM so that the SIM-ATA device is operable. The activation/programming component 120 can facilitate activating and/or programming of the SIM over the air; thus, a subscriber can activate and/or program a SIM-ATA in her home, office, etc.

The activation/programming component 120 can be hardware, software, firmware, a combination thereof, etc. For example, the activation/programming component 120 can be software that utilizes the data (e.g., unique identification number, account number, user name, phone number, . . . ) obtained via the I/O component 110 to configure the SIM for operation. By way of illustration, the activation/programming component can effectuate reading data from a SIM, writing data to a SIM, etc. Data can be read from an activated SIM (e.g., utilized for a mobile device, . . . ) and/or obtained from a network, and thereafter written into memory of the SIM-ATA module. The activation/programming component 120 can additionally provide a signal to a cellular network to activate a SIM and/or a SIM-ATA device. Thus, for example, the activation/programming component 120 can provide the cellular network with data to activate the SIM and/or SIM-ATA such as an IP address of the SIM-ATA, an account number for the subscriber, a phone number, SIM-ATA equipment number, etc. Additionally or alternatively, the SIM-ATA device can provide such data to the cellular network.

The activation/programming component 120 can be part of a mobile device, an SIM-ATA device, a cellular network, or a combination thereof. Furthermore, the subject invention is not limited to the activation/programming component 120 being one component; for example, the activation/programming component 120 can include one component that programs the SIM and another component that activates the SIM-ATA. Thus, the SIM could be pre-programmed by utilizing a mobile device that includes the portion of the activation/programming component 120 that programs the SIM. Thereafter, when the SIM is inserted into the SIM-ATA device, the portion of the activation/programming component 120 that facilitates activation can activate the SIM-ATA over the Internet. Additionally, the SIM-ATA module can be pre-programmed and activated via the Internet by utilizing the activation/programming component 120.

By way of illustration, the SIM uniquely identifies a customer to a digital communication network, e.g., a cellular network, such that the customer can be at least identified and billed for services that have been utilized. A programmed and activated SIM can be employed with the SIM-ATA, which can couple a telephone to a cellular network via VoIP (Voice over IP), thereby allowing a cellular service provider to provide an alternative communication service. Instead of using a conventional telephone service such as a plain old telephone service (POTS), a subscriber can plug an analog telephone into the SIM-ATA and receive telephone service from a cellular service provider, eliminating or reducing a need for a traditional Local Exchange Carrier. The SIM-ATA converts signals from analog to digital, and vice-versa. Once the analog telephone signal has been converted to digital, an Internet Protocol (IP) based protocol (e.g., VoIP) can be used to transmit the telephone call over a digital network.

The activation/programming component 120 can facilitate programming and/or activating a SIM without a concurrent connection to a cellular network. Additionally, the activation/programming component 120 mitigates fraudulent activations of SIMs where an individual attempts to active the SIM-ATA without an active cellular registration (e.g., by falsely attempting to utilize another subscriber's account information).

Figure 2:
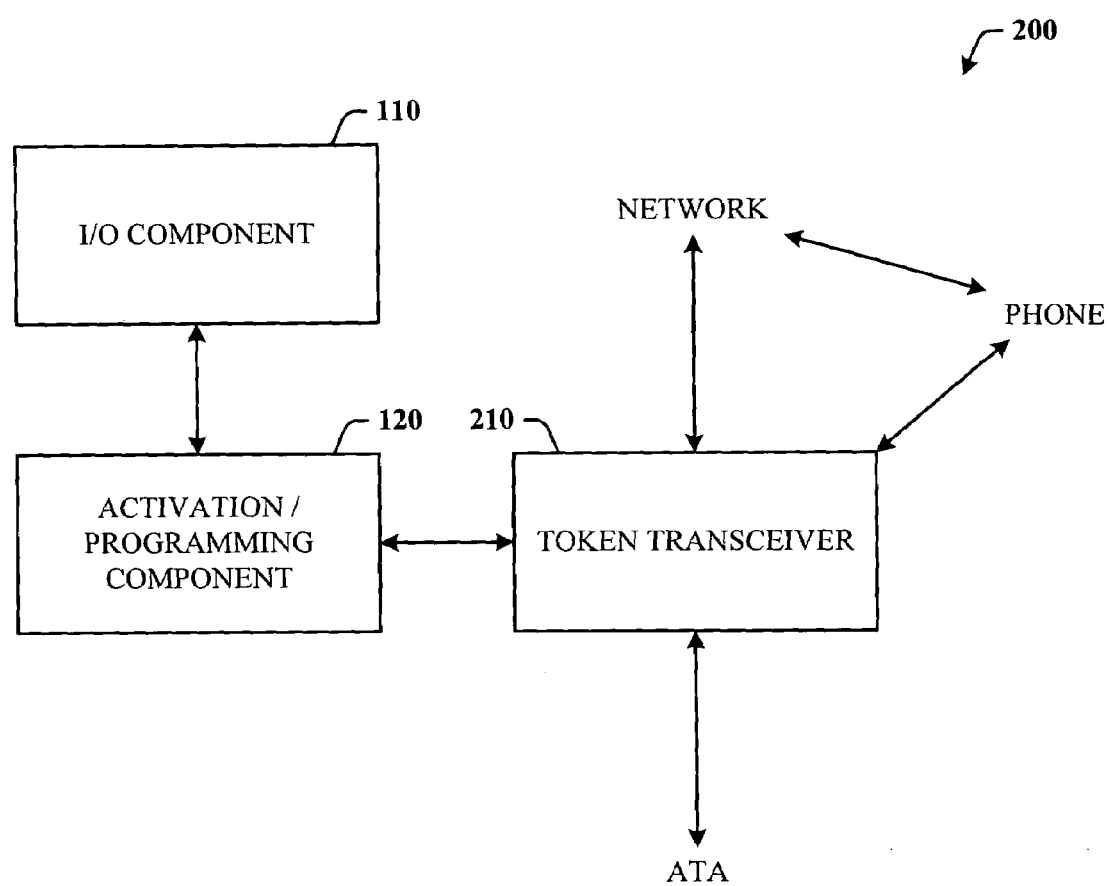
FIG. 2 illustrates a block diagram of a system that activates and/or programs a SIM-ATA device according to an aspect of the subject invention.

With reference to FIG. 2, illustrated is a system 200 that programs and/or activates a SIM enabled ATA device utilizing a token according to an aspect of the subject invention. The system 200 comprises the I/O component 110 and the activation/programming component 120. The I/O component 110 can send and/or receive data, and the communications can be, for example, with a network (e.g., cellular network, Internet, . . . ). The activation/programming component 120 facilitates activating and/or programming of a SIM-ATA module. The system 200 additionally includes a token transceiver 210 that is coupled to the activation/programming component 120. The token transceiver 210 can receive a token that enables the activation/programming component 120 to begin activating and/or programming the SIM. For example, the token transceiver 210 can receive the token from a subscriber's mobile device, and the subscriber's mobile device can receive the token while the subscriber's device is connected to a cellular network. Additionally, the token transceiver 210 can send a signal via the mobile device to the network to facilitate the network transmitting the token. The signal can be transmitted by the token transceiver 210, for example, upon a subscriber's request, automatically when the mobile device has a concurrent connection to a cellular network, when the SIM-ATA module is coupled to the activation/programming component 210 (see infra interface component 310). According to an aspect of the subject invention, the token can have a limited validity period.

The token transceiver 210 can communicate with the mobile device by any communication means such as, for example, a wired connection, wireless transmission, a port, an interface, etc. By way of illustration, the token can be transmitted by the mobile device to the token transceiver 210 via short range RF. According to an aspect of the subject invention, the token transceiver 210, activation/programming component 120, and I/O component 110 can reside in the ATA. Thus, the ATA can obtain the token transmitted from the mobile device via short range RF by utilizing the token transceiver 210. Alternatively or additionally, the mobile device can comprise the token transceiver 210, the activation/programming component 120 and/or the I/O component 110.

The token can be provided to the activation/programming component 120, which can request activation and/or programming of the SIM via transmitting the token and/or a request to begin programming and/or activation with the I/O component 110 over an Internet connection to the cellular network. Additionally or alternatively, the receipt of the token can act as a switch for the activation/programming component 120, whereby the presence of the token permits the activation/programming component 120 to begin operation and the absence of the token prohibits such action.

To mitigate fraudulent activation activity, the cellular network and/or activation/programming component 120 can be configured to recognize a token for a limited time period. The subject invention contemplates employing a time period that is sufficient to allow a subscriber to obtain the token while in an area where her mobile device connects to the cellular network and travel to a location of a SIM-ATA, which potentially does not have a concurrent connection to the cellular network. After the time period expires, the token is invalid and the SIM-ATA cannot be activated. According to an aspect of the subject invention, the token can be time stamped with data related to when it was conveyed by the cellular network, and the activation/programming component 120 can have a preset time limit related to how long the token is valid. The activation/programming component 120 can evaluate the token to determine whether it remains valid. Alternatively, a network can utilize the time stamp information to evaluate the validity. According to another example, the token can include data related to a time when it is no longer valid.

Figure 3:
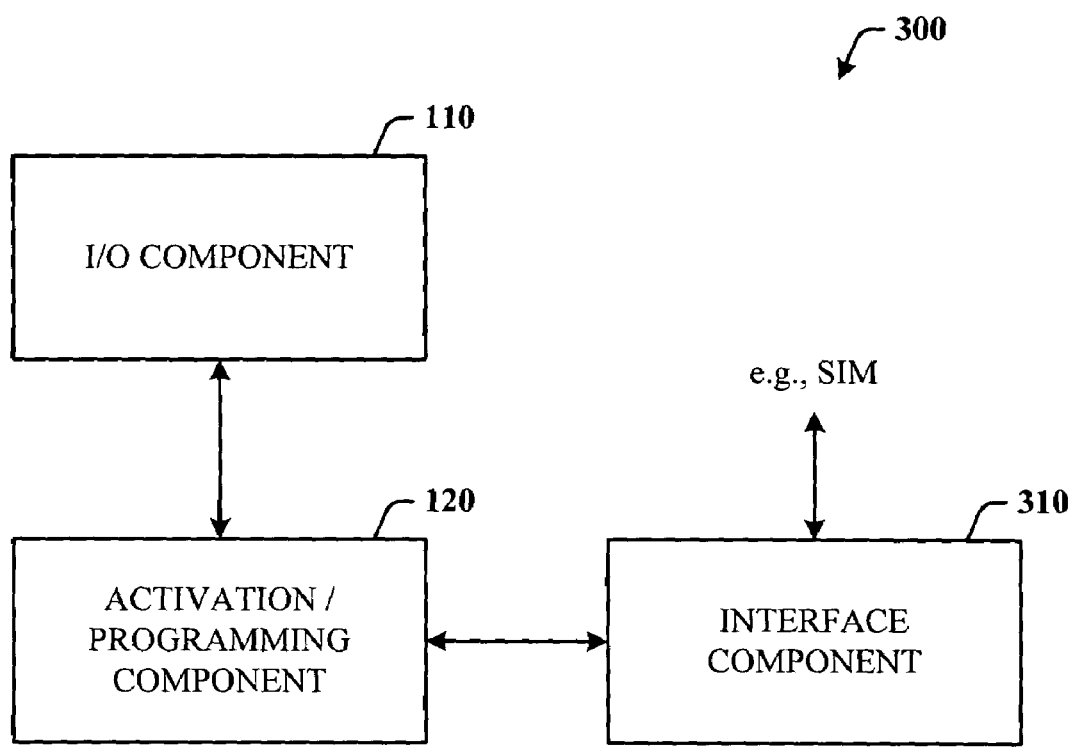
FIG. 3 illustrates a block diagram of a system that activates and/or programs a SIM-ATA device that includes an interface component according to an aspect of the subject invention.

FIG. 3 depicts a system 300 that facilitates programming and/or activation of a SIM enabled ATA in accordance with an aspect of the subject invention. The system 300 includes the I/O component 110, the activation/programming component 120, and an interface component 310 that is coupled to the activation/programming component 120. The interface component 310 is capable of communicating with a SIM employed by a SIM-ATA. By way of illustration, the interface component 310 can be a SIM socket. According to an aspect of the subject invention, a mobile device can comprise a SIM socket or a plurality of SIM sockets. The subject invention additionally contemplates that the interface component 310 can be any device, port, connection, and/or interface that can communicate with a SIM card and is not limited to a SIM socket.

According to an example, a mobile device can include the interface component 310, and the interface component 310 can be two SIM sockets. A SIM employed by the mobile device can occupy one of the SIM sockets, and a SIM for a SIM-ATA can be inserted into the empty, second SIM socket. While the SIM-ATA module is inserted in the SIM socket, the activation/programming component 120 can initiate programming of the module. For example, the activation/programming component 120 can provide a signal to a network via the I/O component 110 that indicates to the network to begin transmitting programming data, requesting data, and/or utilizing network software to program the module in response. Additionally or alternatively, the mobile device can include software that can program the SIM. For example, the mobile device or network software can transfer data or a portion of the data stored upon the device's SIM to the SIM-ATA module. Thus, information such as account number, billing information, subscriber name, telephone number, etc. can be provided to the SIM of the SIM-ATA from the network and/or between the two SIM cards. By programming the SIM while located in the SIM socket of the mobile device, SIM-write circuitry and software is not required in the ATA device.

By way of further illustration, a mobile device can include an interface component 310 that includes one SIM socket. The activated SIM for the mobile device can be removed from the interface component 310, and the SIM of the SIM-ATA can be inserted. The SIM of the SIM-ATA can thereby be activated and/or programmed similarly to the manner in which the mobile device's SIM is activated and/or programmed. Upon programming and/or activation, the SIM-ATA module can be removed from the interface component 310 and inserted into the SIM-ATA device. According to an aspect of the subject invention, the SIM of the SIM-ATA can be programmed and activated while engaged with the interface component 310. Alternatively, the SIM can be programmed while coupled to the interface component 310, and the SIM-ATA can finish activation by reporting additional data to the cellular network after it is programmed into the SIM-ATA. For instance, the SIM-ATA can send an IP address, SIM-ATA equipment number, etc.

Figure 4:
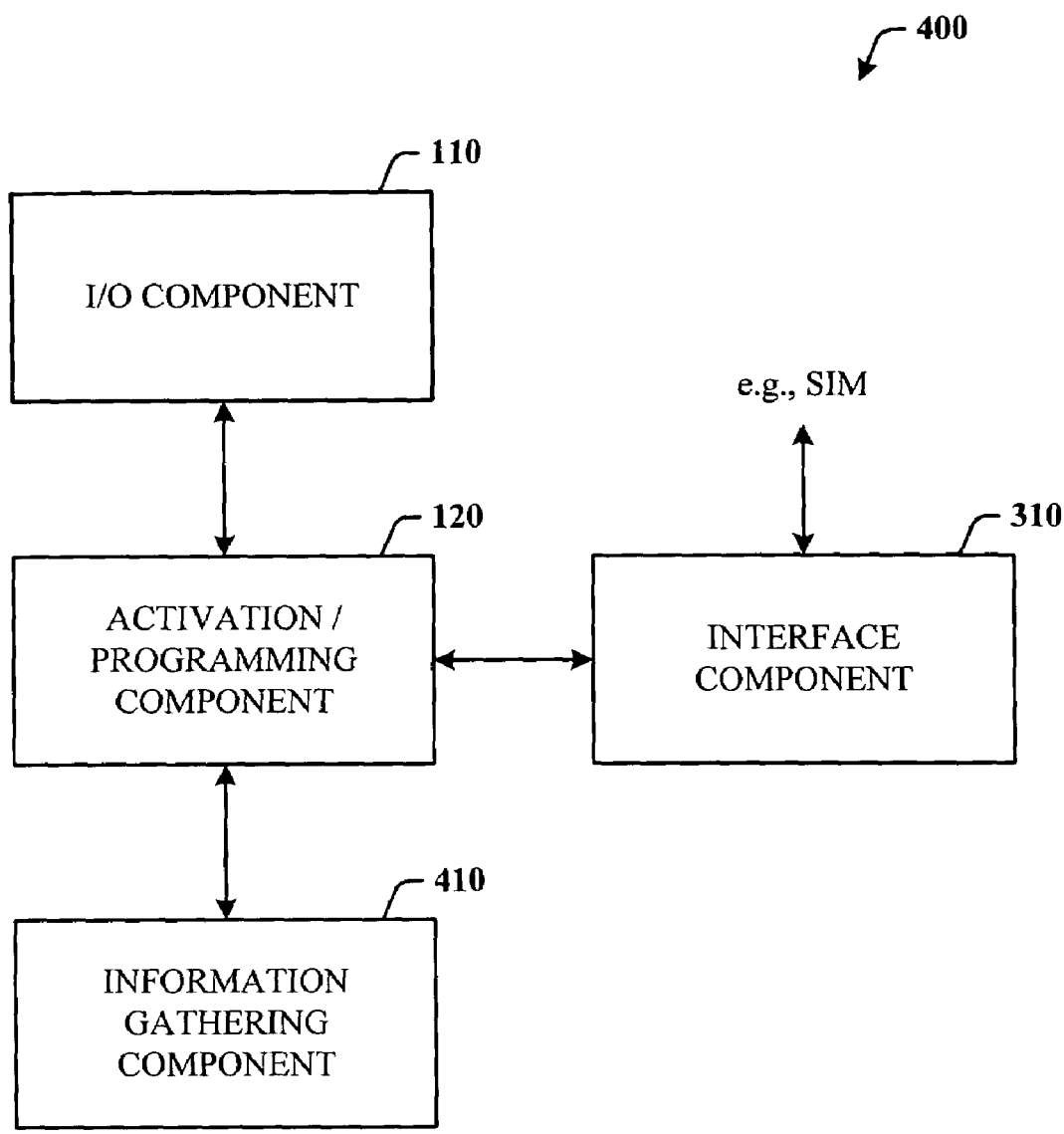
FIG. 4 illustrates a block diagram of a system that gathers additional information that is employed in connection with activation and/or programming of a SIM-ATA device in accordance with an aspect of the subject invention.

Turning to FIG. 4, a system 400 is depicted that programs and/or activates a SIM that is employed with a SIM-ATA device. The system 400 includes the I/O component 100, the activation/programming component 120, and the interface component 310. In addition, the system 400 comprises an information gathering component 410 that is operable to obtain additional data during programming and/or activation of the SIM.

According to an aspect of the subject invention, the information gathering component 410 can be a user interface (e.g., human-machine interface, display with input device such as a mouse, touch screen, keyboard, or mobile device input, . . . ). A subscriber can be presented with a query and provide data in response. For example, the subscriber can be asked for a username, account number, and/or password. Upon entry of such information, the activation/programming component 120 can begin operation. Additionally or alternatively, the user can be prompted to input or select to input data regarding personalization and preferences associated with the SIM-ATA.

By way of further example, the information gathering component can be a transceiver. When a SIM is coupled with the interface component 310, the information gathering component 410 can extract additional data from other devices such as the SIM-ATA device. According to an aspect, the information gathering component 410 can utilize short range RF to extract data from other devices; however, the subject invention is not so limited to such a technique.

Figure 5:
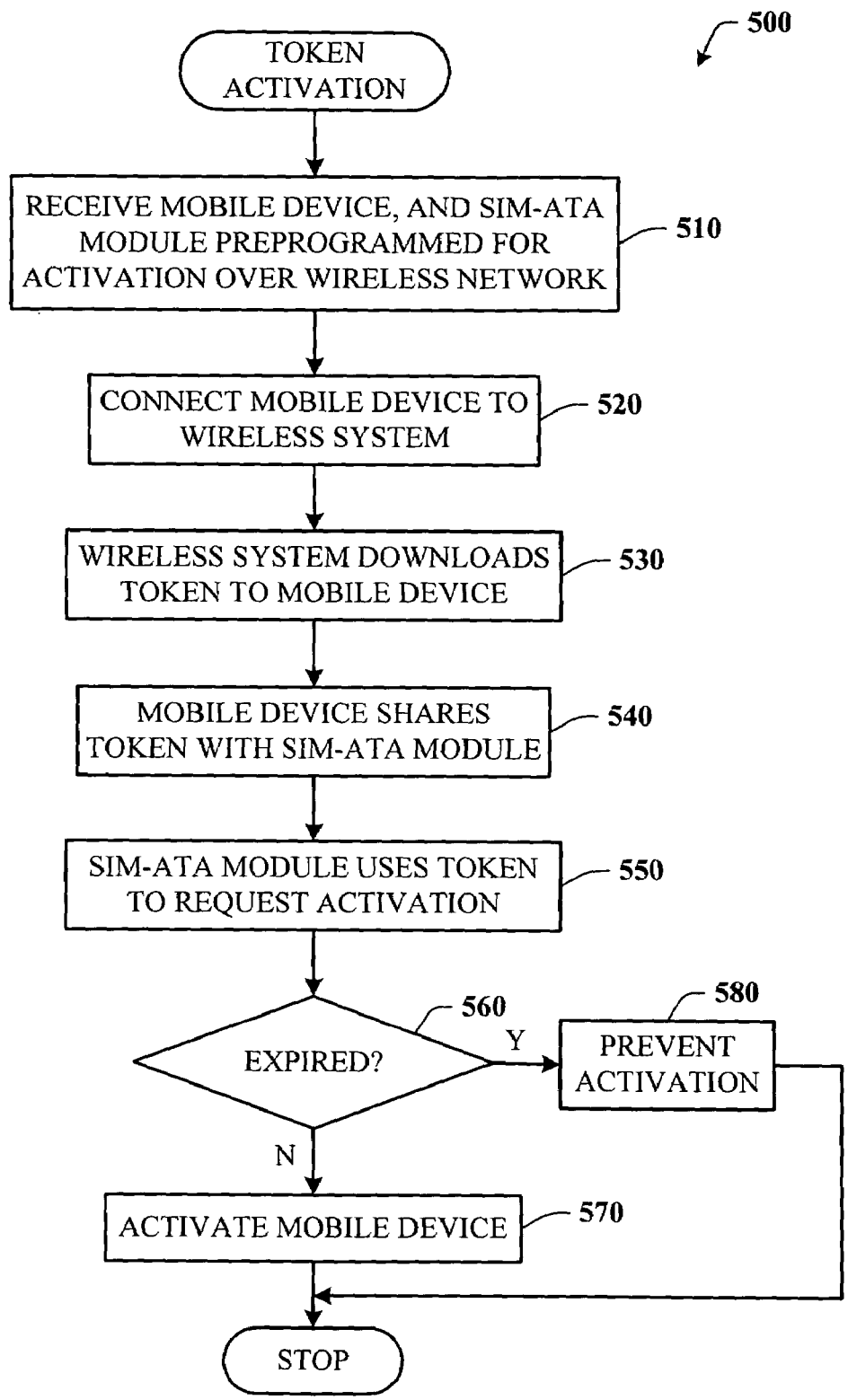
FIG. 5 illustrates a flow diagram of a methodology for activating and/or programming a SIM-ATA device via a token in accordance with an aspect of the subject invention.

Referring now to FIG. 5, there is illustrated a flow chart of method 500 for using a token for programming and/or activating a SIM-ATA device. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the subject invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

At 510, a mobile device is provided with the SIM-ATA module preprogrammed for activation over a wireless network such as the Internet. Alternatively, the SIM can be programmed via the methodology 500 and thus not be programmed previously. At 520, the mobile device is connected to a wireless system (e.g., subscriber travels to a location where the mobile device receives adequate signal strength, turn on mobile device, . . . ). At 530, the wireless system downloads a token to the mobile device. For example, the token can be transmitted automatically, upon request from the mobile device (e.g., initiated by the activation/programming component 120 and/or the token transceiver 210, via user inputted request, . . . ). At 540, the mobile device shares the token with the SIM-ATA module. According to an aspect of the subject invention, the mobile device can send the token via a short range radio frequency (RF) transmission. At 550, the SIM-ATA module uses the token to request activation. Additionally or alternatively, if a non-programmed SIM is employed in connection with the subject invention, the SIM-ATA module can request programming of the SIM. The request for activating and/or programming of the SIM can be made to the wireless system, the activation/programming component 120, etc. The validity of the token is evaluated at 560. In particular, a determination is made as to whether the token has expired since the token can be configured to be recognized for a limited time period. If the token is not expired, at 570 the SIM-ATA is activated at 570. Additionally or alternatively, the SIM can be programmed. If the token has expired, activation and/or programming is prevented at 580.

Figure 6:
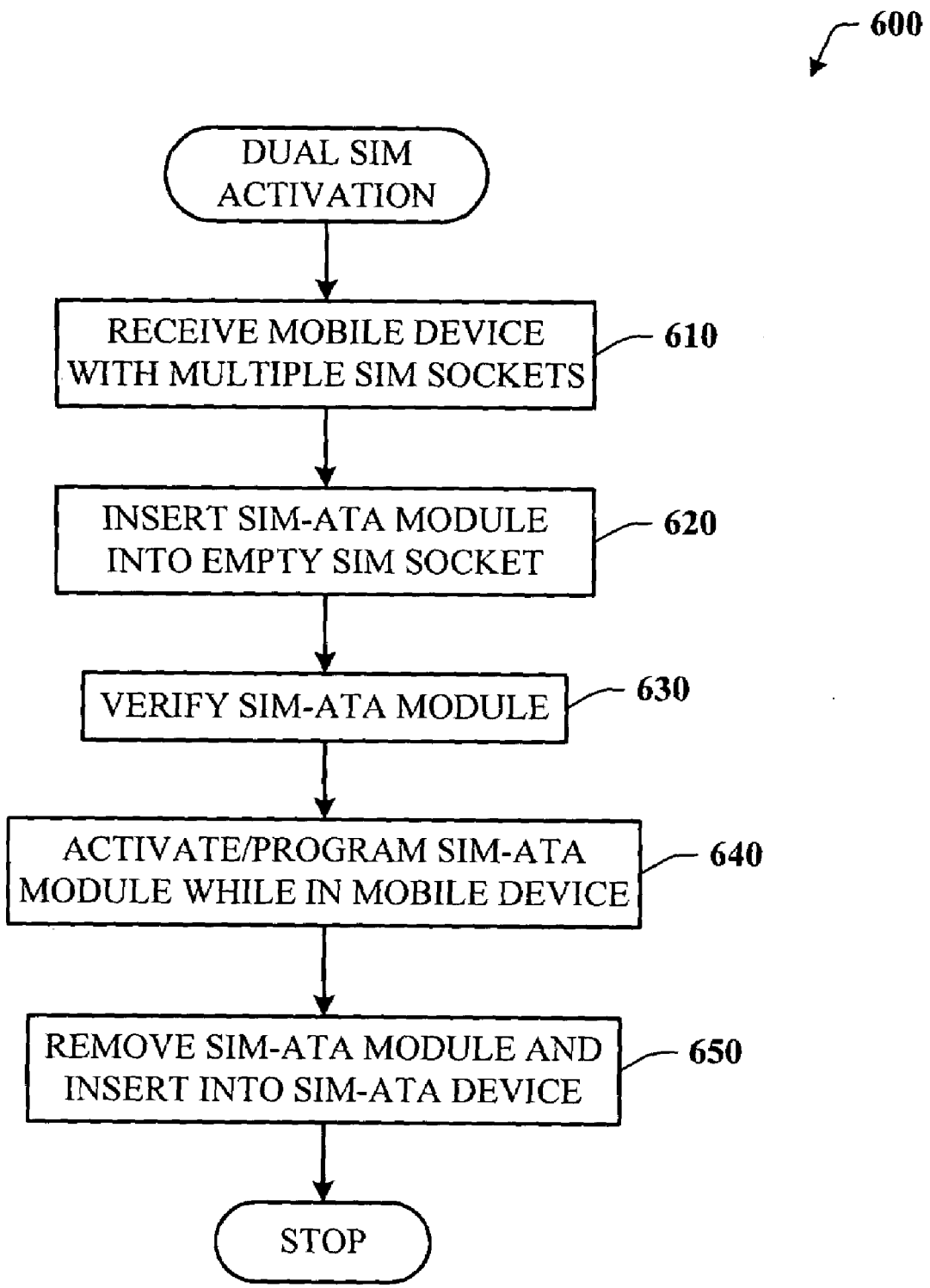
FIG. 6 illustrates a flow diagram of a methodology for activating and/or programming a SIM-ATA device via a plurality of SIM sockets according to an aspect of the subject invention.

With reference to FIG. 6, illustrated is a methodology 600 for programming and/or activating a SIM enabled ATA device utilizing two SIM cards according to an aspect of the subject invention. At 610, a mobile device (e.g., cellular phone, PDA, laptop computer, handheld computer, . . . ) with multiple SIM sockets is provided. The subject invention contemplates the use of any number of SIM sockets and is not limited to employing two SIM sockets. Additionally, the subject invention contemplates the use of alternative means of coupling the mobile device and the SIMs such as any wired and/or wireless connection, port, transceiver, etc. At 620, SIM of the SIM-ATA device is inserted into an empty SIM socket of the mobile device. The mobile device's SIM remains simultaneously engaged in another of the SIM sockets. At 630, the SIM utilized with the SIM-ATA is verified (e.g., verifying account number, phone number, subscriber identification information, . . . ). At 640, the SIM of the SIM-ATA is activated and/or programmed while in the mobile device.

Data utilized in connection with activating and/or programming the SIM can be obtained from the mobile device's SIM, via short range RF transmissions with the SIM-ATA (e.g., extract data such as IP address, SIM-ATA equipment number, . . . ), etc. At 650, the SIM of the SIM-ATA is removed from the mobile device and inserted into the SIM-ATA device.

Figure 7:
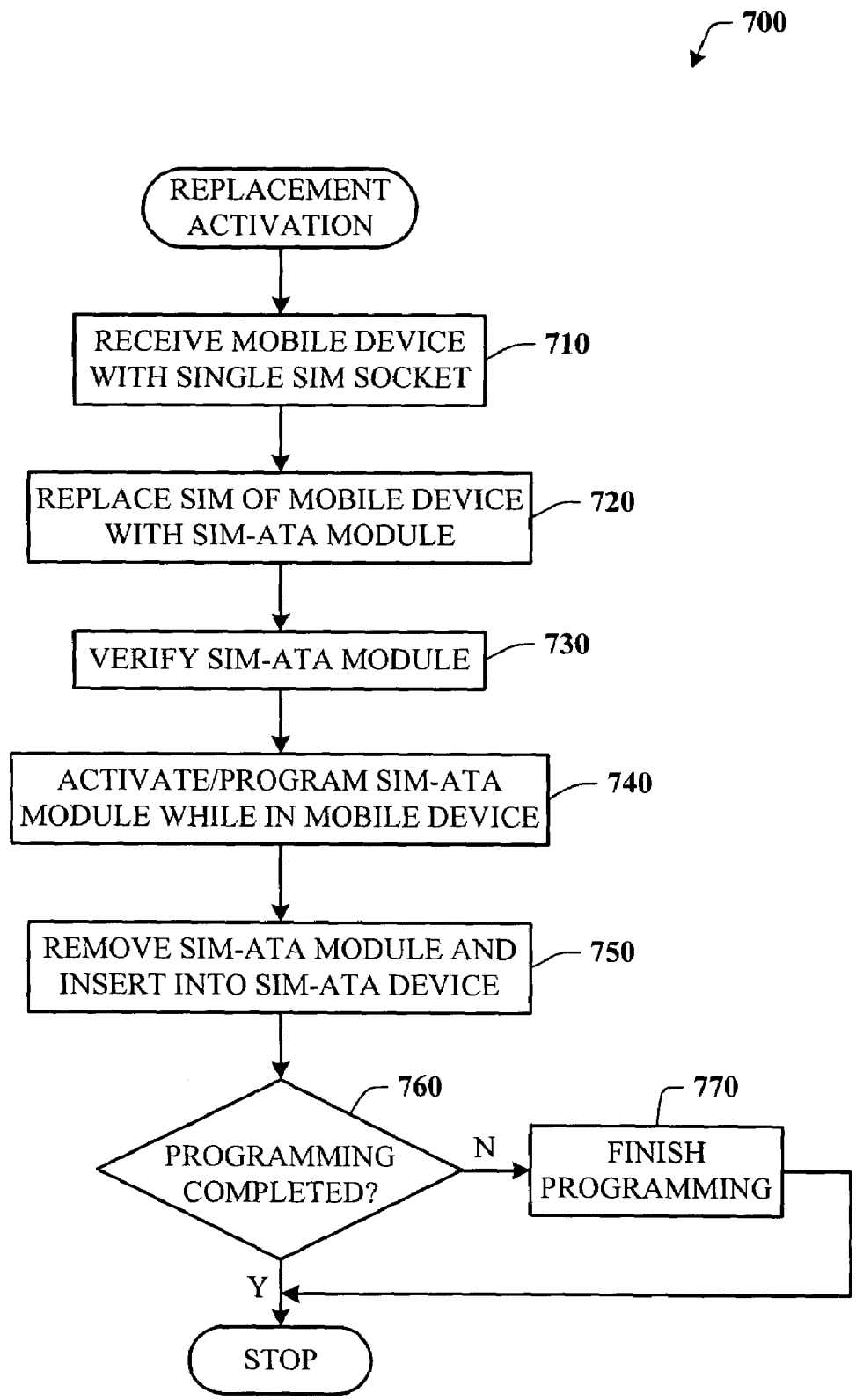
FIG. 7 illustrates a flow diagram of a methodology for activating and/or programming a SIM-ATA device according to an aspect of the subject invention.

Turning to FIG. 7, a methodology 700 is depicted for activating and/or programming a SIM enabled ATA device by employing a mobile device with one SIM socket according to an aspect of the subject invention. At 710, a mobile device with a single SIM socket is provided. At 720, the SIM of the mobile device is replaced with the SIM of the SIM-ATA. At 730, the SIM of the SIM-ATA is verified. More particularly, the data from the mobile device's SIM (e.g., account number, phone number, . . . ) can be compared with the request to activate the SIM, thus ensuring that the SIM-ATA device is being activated for the correct individual. At 740, the SIM of the SIM-ATA device is activated and/or programmed while coupled to the mobile device. The SIM is removed from the mobile device and inserted into the SIM-ATA device at 750. At 760, a determination is made whether programming and/or activation of the SIM-ATA is complete. If programming and/or activation are determined to be complete, then the methodology reaches a stop block. If programming and/or activation are incomplete, then at 770 the SIM-ATA device can finish such actions. In particular, the SIM-ATA can program information into its SIM and/or provide additional data to a cellular network. For instance, the SIM-ATA can transmit data such as an IP address, SIM-ATA equipment number, etc.

Figure 8:
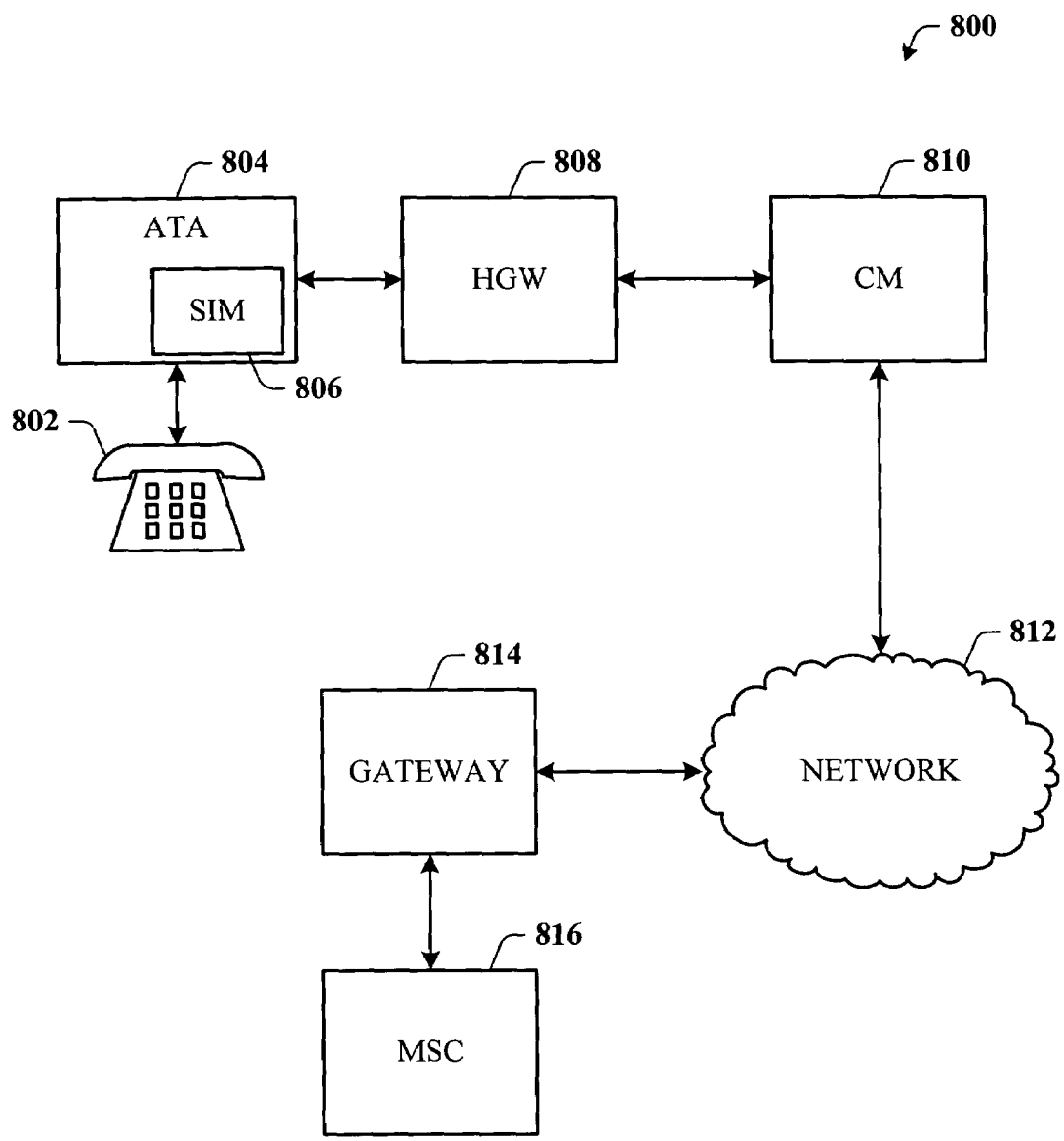
FIG. 8 illustrates a block diagram of a communication system according to an aspect of the subject invention.

Referring now to FIG. 8, there is illustrated a block diagram of a communication system 800 according to one embodiment of the subject invention. The system 800 includes an analog telephone 802 connected to a SIM-ATA system 804 that incorporates a SIM 806 for subscriber identity data. The SIM 806 is programmed and/or activated, for example, by utilizing the aforementioned techniques. The SIM-ATA system 804 connects to a Home Gateway (HGW) block 808 that provides an interface to a cable modem (CM) 810 (or a DSL modem, T1 connection, . . . ) for communication over a broadband communication network. The HGW 808 facilitates the interface between the home telephone network and the IP-based network commonly associated with a LAN, WAN, WWAN, and a global communications network (e.g., the Internet). The CM 810 facilitates the interface and IP communication to a network 812, e.g., the Internet. A second gateway 814 interfaces a cellular service provider's MSC (Mobile Services Switching Center) 816 to the network 812. The system 800 also accommodates voice and IP traffic in the reverse direction, from the MSC 816 over the network 812 to the SIM-ATA system 804.

The user connects the SIM-ATA module 804 to the analog phone 802 and to the HGW 808. Any call using the analog telephone 802 can be now placed through the IP network 812 to the MSC 816. Similarly, any cellular call to the telephone number associated with the SIM 806 can be made through the cellular network (not shown) to the MSC 816, allowing the user at the analog telephone 802 to receive the call using VoIP.

Note that the SIM-ATA 804 and HGW 808 can be combined into a single unit to further facilitate implementation of the subject invention to home and/or business systems that do not have a gateway suitable for such implementation. It is further to be appreciated that the SIM-ATA module 804, HGW 808, and the CM 810 can be combined into a single unit.

Figure 9:
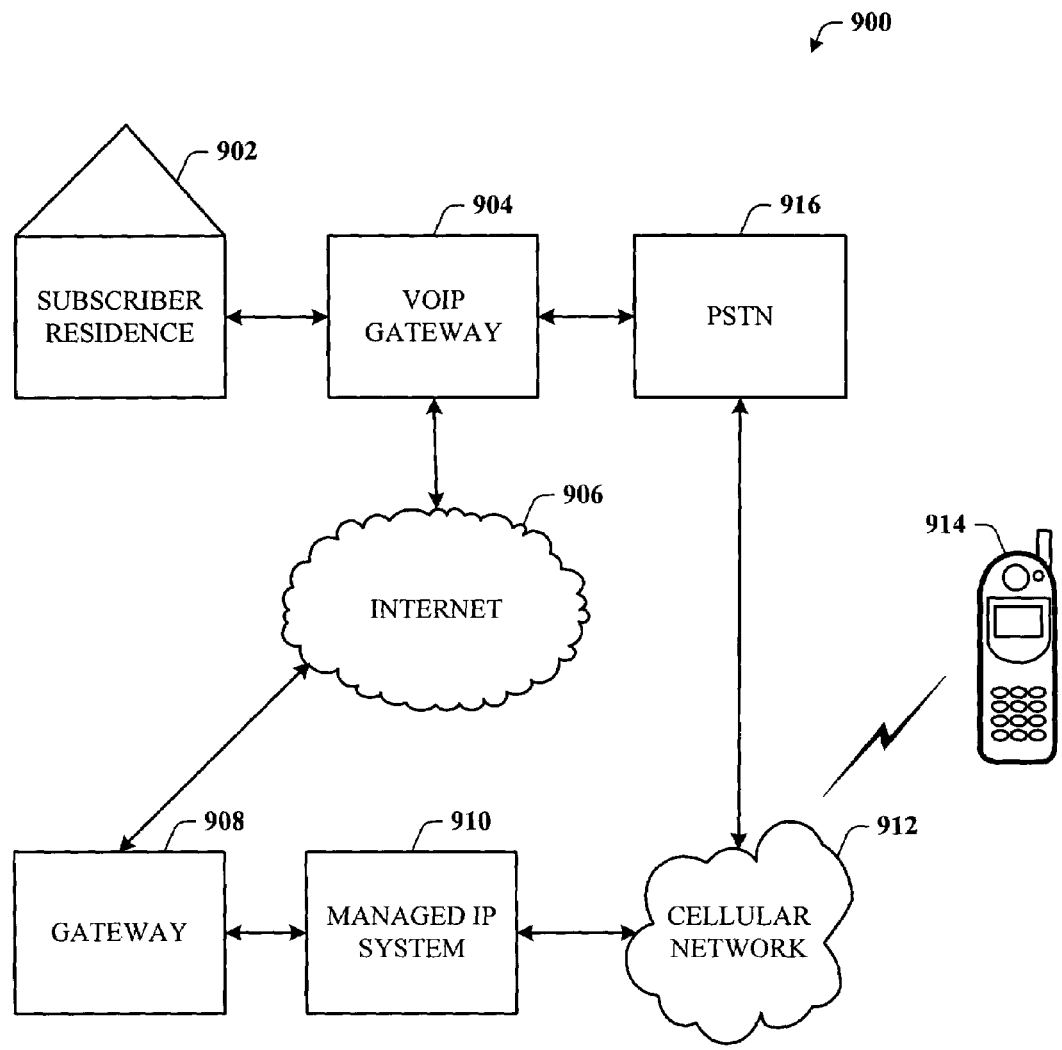
FIG. 9 illustrates a block diagram of a communication system according to an aspect of the subject invention.

Referring now to FIG. 9, there is illustrated a block diagram of a network architecture communication system 900 according to one embodiment of the subject invention. A subscriber residence 902 communicates VoIP traffic to a VoIP gateway 904 that interfaces IP traffic to a global communication network 906, e.g., the Internet. A second gateway 908 receives the VoIP traffic from the Internet 906 and forwards it to a managed IP system 910. A cellular network 912 receives the IP traffic from the managed IP system 910 and communicates the IP conversations to a cell phone 914. Note that the residence 902 may also communicate telephone signals over the Public Switched Telephone Network (PSTN) 916 via the VoIP gateway 904, and then to the cell phone 914 through the cellular network 912. The system accommodates voice traffic in the reverse direction, from the cellular caller to a callee on an analog telephone at the residence 902. Note that the interconnection of the gateway 904 to either or both of the PSTN 916 and the Internet 906 can be accomplished by a satellite system, where the signals from the gateway 904 are communicated first to a satellite and then to compatible land-based transceiving equipment.

Figure 10:
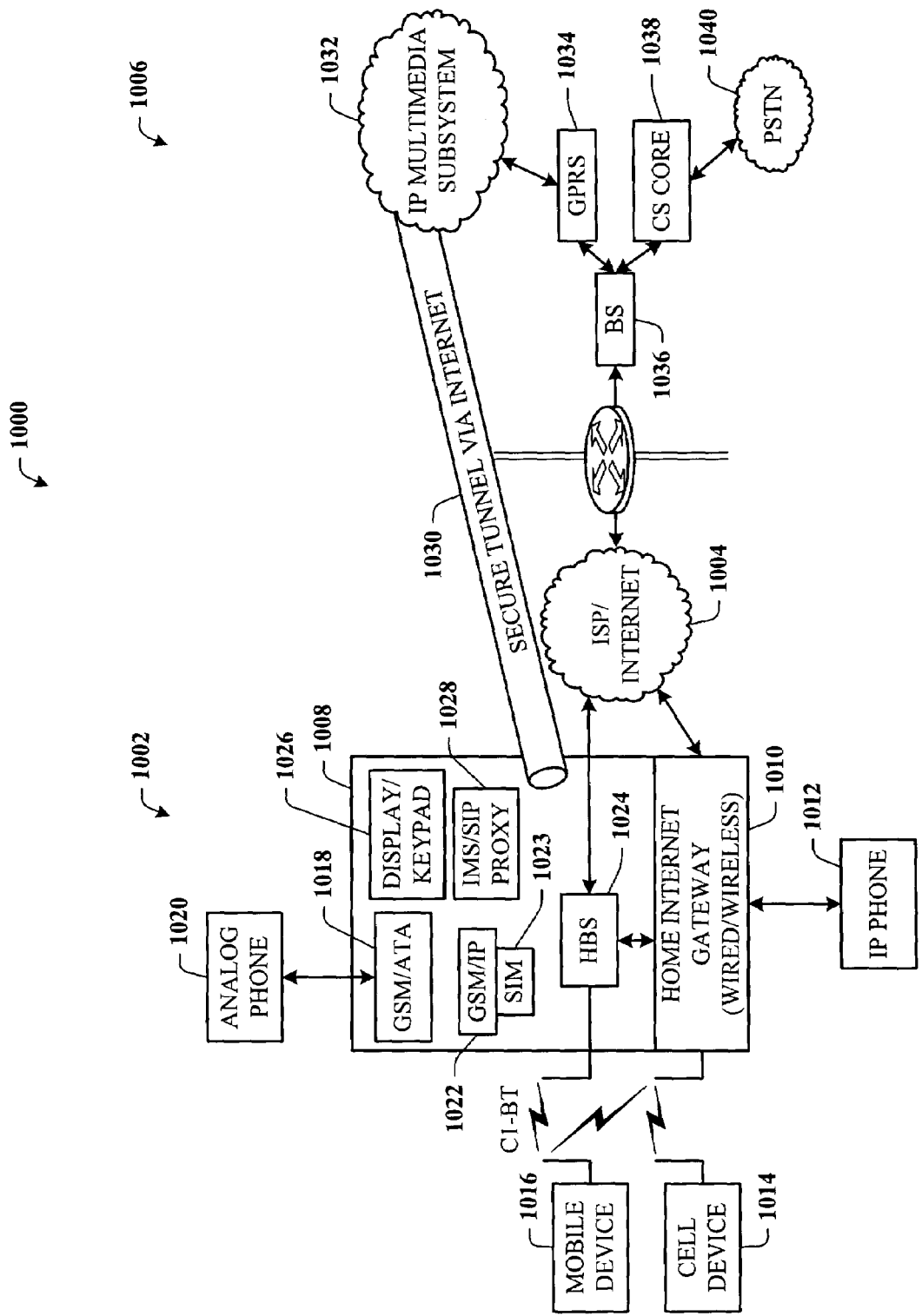
FIG. 10 illustrates a diagram of a system representative of a residential network architecture in accordance with an aspect of the subject invention.

Referring now to FIG. 10, there is illustrated a diagram of a system 1000 representative of a residential network architecture in accordance with the subject invention. The system 1000 facilitates communicating all home communications needs though a single broadband pipe. This includes all telephone services, both analog and digital, whether wired or wireless. This further includes computing connections for all IP data traffic.

The system 1000 includes three systems: a home system 1002 that includes all subsystems in the home environment for operation in accordance with the subject invention; a global communication network 1004, e.g., the Internet; and, a provider services system 1006, that facilitates one or more services to the home system 1002.

With respect to home telephone needs, there is provided a system unit 1008 that facilitates all telephone-related communications, both IP-based and non-IP based communications traffic. The unit 1008 can accommodate a variety of telephone and wireless devices. For devices already suitable for wired and/or wireless IP communications, the unit 1008 interfaces to a home Internet gateway (HIG) 1010. The HIG 1010 accommodates, for example, an IP phone 1012 via IEEE 802.3 and an RJ-45 connector; a cellular device 1014 capable of communications using IEEE 802.11a/b/g/e technology; and a mobile device 1016 capable of wired and/or wireless interface thereto (e.g., communications using IEEE 802.11a/b/g/e technology).

The unit 1008 also includes an ATA adapter 1018 that facilitates analog-to-digital conversion of analog voice signals of an analog phone 1020. The unit 1008 includes an IP component 1022 that interfaces to a SIM module 1023 for at least accessing the subscriber identification and account information. A home broadband services (HBS) component 1024 of the unit 1008 facilitates wireless communication with the mobile device 1016 using, e.g., Bluetooth technology, or a similar medium range wireless technology. The HBS 1024 also interfaces to the HIG 1010 and the Internet 1004 to communicate broadband IP traffic. The HIG 1010 also interfaces to the Internet 1004 to communicate IP traffic according to IEEE 802.16, for example. The unit 1008 includes a display/keyboard/keypad 1026 for user interaction and support of messaging services to the home, and an IMS/SIP (IP Multimedia Subsystem/Session Initiation Protocol) proxy 1028. IMS is a mobile architectural framework for providing multimedia services from the provider system 1006 using SIP with communication networks. SIP is a protocol for establishing preferred communication method and/or bearer between two user agents (UAs). It is a text based signaling protocol that is well suited for supporting intermediate servers. SIP for Instant Messaging and Presence Leveraging Extensions (SIMPLE) is an extension to the SIM protocol that supports Instant Messaging (IM) and Presence. SIMPLE is a mix of signaling and application protocol. IMS can provide network support for communication method selection, and provides an agreed profile of SIP usage and system functionality. For example, IMS may require that UAs must register before attempting to establish a session.

The unit 1008 communicates over the Internet 1004 via a secure tunnel 1030. Since conversational communications are inherently private, the tunnel is employed to ensure privacy when communicating over IP-based networks. The tunnel 1030 interfaces to an IP multimedia system 1032 of the provider system 1006, which system 1032 also provides multimedia services through the tunnel to the unit 1008. Such multimedia services can also be provided from the provider system 1006 directly to the Internet 1004, instead of using the tunnel 1030. The provider system 1006 can also include a GPRS (General Packet Radio System, an always-on packet data service) node system 1034 that connects to the multimedia system 1032, and a base station (BS) system 1036 that interconnects the GPRS system 1034 to the Internet 1004 (using frame relay, for example) to provide GPRS IP services using cellular networks. This allows one person using a mobile phone to talk to another using with a fixed phone. The BS 1036 converts call signals and voice sent from the mobile phone (using, e.g., Bluetooth protocol) into IP packets. The BS 1036 converts these IP packets into cellular signals and voice codecs to transmit out to the cellular network, and then to the fixed telephone. The provider system 1006 also includes a cellular services (CS) core 1038 that interfaces to a PSTN 1040 to the base station 1036 for Internet access. The local proxy 1028 with secure routing to the IMS 1032 multimedia infrastructure allows for network optimization by bypassing the CS core 1038.

For example, if a caller places a call from a standard telephone connected to the PSTN and the called number was a cell phone connected to the cellular system, the call would first be routed from the PSTN to the cellular system. The cellular system checks its subscriber records and discovers that the cellular subscriber's cell phone is registered with the SIM-ATA. The cellular service provider routes the call onto the Internet via the secure tunnel and to the SIM-ATA. The SIM-ATA passes the call to any or all of the communication devices connected to it. For example, if the incoming communication is a VoIP phone call, the SIM-ATA can route the call over a wireless link directly to the subscriber's cellular phone. The SIM-ATA can also ring the subscriber's home telephone (connected to one of the SIM-ATA RJ-11 jacks) at the same time. In this way, the SIM-ATA has great flexibility to deliver incoming communications. In a similar manner, if the subscriber places a call from his home phone that is served by the SIM-ATA, the call may be routed across the Internet to the cellular network, and from there to its destination. Billing information for the call can be facilitated by the U/SIM in the GSM (Global System for Mobile Communications)/ATA 1018. However, it the user chooses to not use VoIP, the call can be routed over normally the PSTN.

Figure 11:
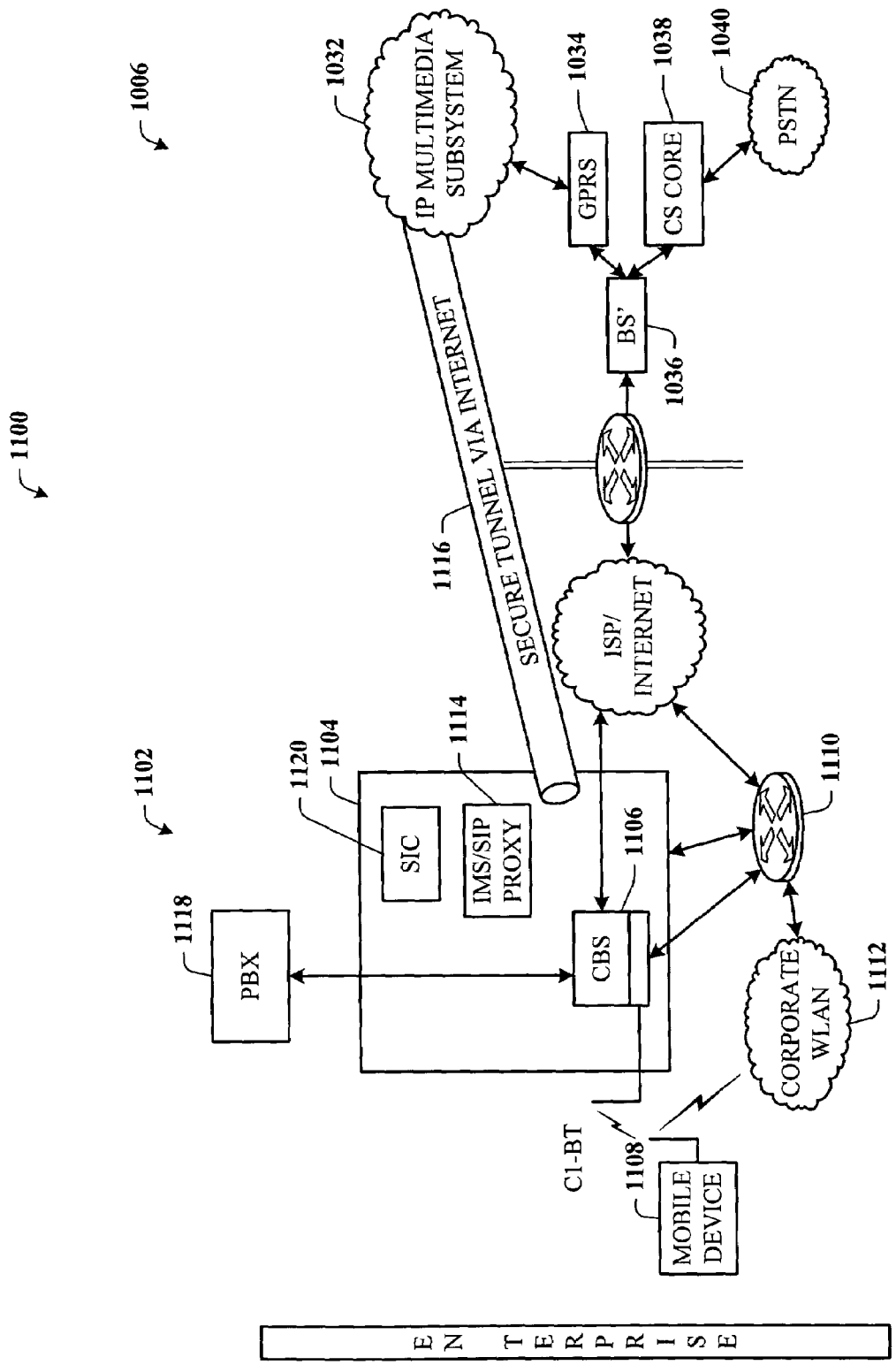
FIG. 11 illustrates a block diagram of an enterprise network architecture communication system according to an aspect of the subject invention.

Referring now to FIG. 11, there is illustrated a block diagram of an enterprise network architecture communication system 1100 according to one embodiment of the subject invention. In this embodiment, a "local" system 1102 includes a local corporate unit (LCU) 1104 with some features similar to the system unit 1008. The system 1102 includes a corporate base station (CBS) 1106 that facilitates wireless short-range communication, e.g., Bluetooth technology, with a mobile device 1108. The CBS 1106 connects to a corporate intranet 1110 for access to corporate services and the ISP/Internet 1004. The intranet 1110 communicates with a corporate WLAN (wireless LAN) 1112 using a wireless communication technology, e.g., IEEE 802.11a/b/g. The WLAN 1112 also facilitates wireless communication with the wireless mobile device 1108 using a wireless technology IEEE 802.11e, for example.

The LCU 1104 also includes an IMS/SIP proxy 1114 (similar to the IMS/SIP proxy 1028) for providing secure Internet tunneling via an IP tunnel 1116 over the Internet 1004 to the provider services system 1006. Deployment of IMS within the cellular service provider core allows for the availability of multimedia services in the wide area network for mobile terminals. The provider services system 1006 includes the IMS system 1032, GPRS 1034, CS core 1038, PSTN 1040, and BS 1036, the functions of which are described hereinabove in FIG. 10. However, it is to be appreciated that the CBS 1106 and the BS 1036 (in an enterprise implementation) can include features different from those used for the residential systems for FIG. 10. The corporate system 1102 can also include a PBX (Private Branch Exchange) telephone switching system 1118 in communication with the LCU 1104 to facilitate VoIP PBX communication to the outside world. Where the business includes one or more analog phones, the LCU 1104 can further include a corporate SIC 1120 that uniquely identifies the business when using VoIP services. Still further, the LCU 1104 can be designed to implements personal SICs such that selected corporate users may insert their own SIC in order to use VoIP cellular services. Alternatively, the corporate SIC 1120 may be programmable such that application updates may be downloaded thereto as persons need to be added or removed. Thus, the business and/or one or more users can obtain the benefits of VoIP multimedia cellular services in accordance with the subject invention.

Figure 12:
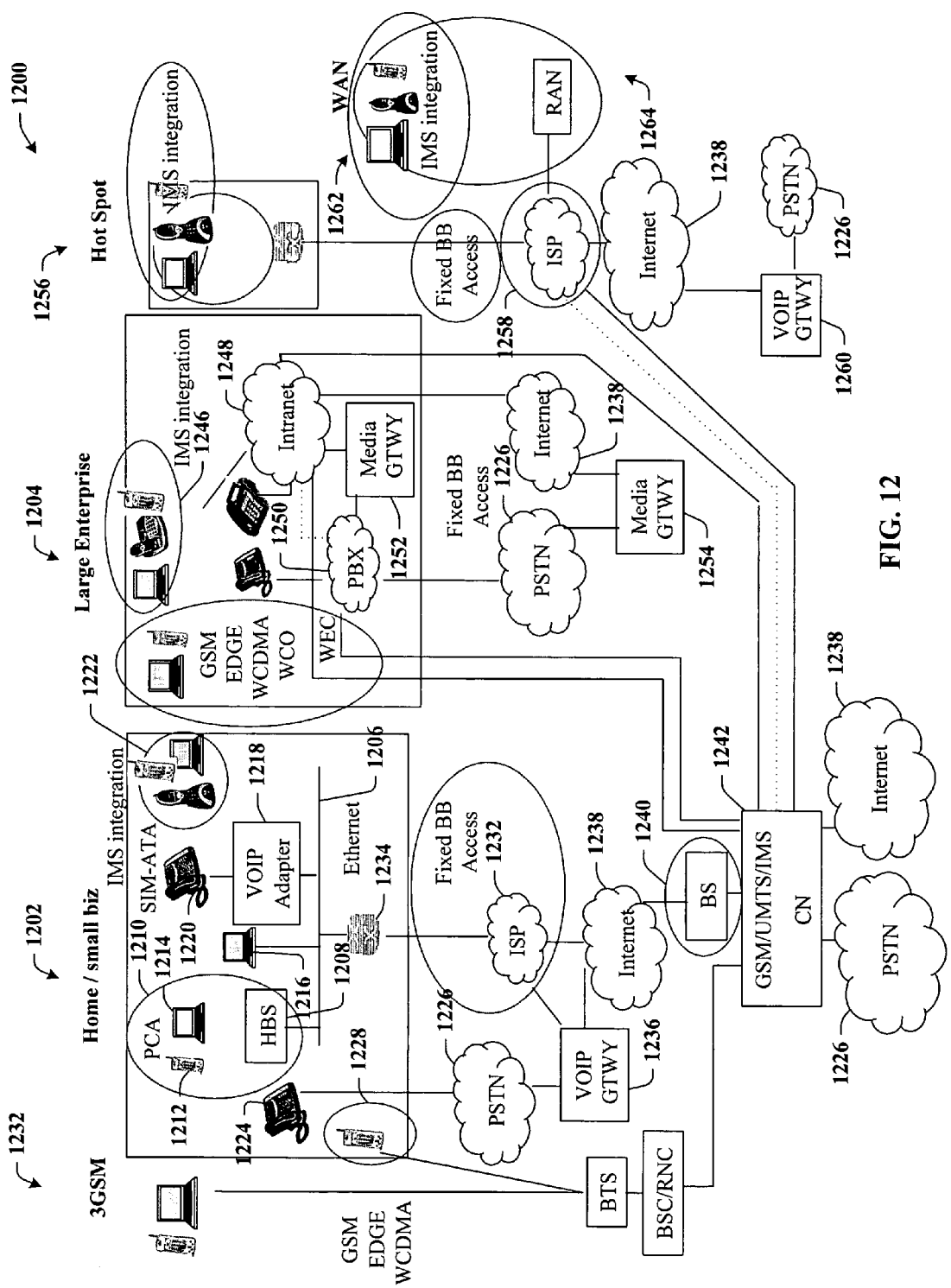
FIG. 12 illustrates a block diagram of a system with home/small business (HSB) system and enterprise system functionality according to an aspect of the subject invention.

Referring now to FIG. 12, there is illustrated a block diagram of a system 1200 with home/small business (HSB) system 1202 and enterprise system 1204 functionality according to one embodiment of the subject invention. The HSB system 1202 includes a local network 1206 disposed on which there is a home base station 1208 that facilitates a PCA (Person Coverage Area) 1210 that allows a mobile device 1212 to communicate wirelessly using, e.g., Bluetooth, and a portable computer 1214 to communicate using IEEE 802.11, for example. A home computer 1216 is also disposed on the local network 1206. A VoIP adapter 1218 connects to the network 1206 to allow the use of an IP phone 1220 for voice over the local IP network 1206. The adapter 1218 also includes the SIM-ATA capabilities of the subject invention. The HSB system 1202 also includes an IMS integration component 1222 for computers, mobile devices, and cellular telephones. An analog telephone 1224 can connect to the PSTN 1226 using conventional means. In addition, a mobile device 1228 can communicate wirelessly to a local cellular wireless system 1230.

The HSB 1202 interfaces to fixed broadband access by connecting to an ISP 1232 via a home broadband modem or router 1234. Fixed broadband access includes at least, cable modem access, DSL (Digital Subscriber Line) access, and wireless such as IEEE802.16. Both the PSTN 1226 and the ISP 1232 connect to a VoIP gateway 1236 for communicating VoIP traffic. Both the VoIP gateway 1236 and the ISP 1232 communicate over the Internet 1238 to a provider service system base station (BS) 1240. The local cellular system 1230 and the BS 1240 connect to the provider's core network (CN) 1242, which facilitates interconnectivity to GSM systems, UMTS (Universal Mobile Telecommunications System) systems, and IMS. The CN 1242 also connects directly to the PSTN 1226 and the Internet 1238.

The local cellular system 1230 allows wireless connectivity of suitable computers and mobile devices via GSM, EDGE (Enhanced Data for GSM Evolution), and WCDMA (Wideband CDMA, the air interface for UMTS) to a BTS (Base Transceiver Station). From the BTS, the system connects to the CN 1242 via a BSC (Base Station Controller)/ RNC (Routing Network Controller).

The enterprise system 1204 includes a GSM/EDGE/ WCDMA/WCO (Wireless Communications Options) subsystem 1244, an IMS integration subsystem 1246, a corporate intranet 1248, and a PBX 1250. Although not shown, the enterprise system 1204 may also includes its own CBS for analog telephone use of VoIP in accordance with the subject invention. Corporate phones may be suitable for connection to the intranet 1248 and the PBX 1250. The intranet 1248 connects to the CN 1242 both through the subsystem 1244 (using WEC-Wireless Ethernet Connectivity) and directly. The intranet 1248 also connects to the PBX 1250 via a media gateway 1252. The enterprise system 1204 typically has direct fixed broadband access to the Internet 1235. The PBX 1250 connects to the PSTN 1226, and to the Internet via a media gateway 1254.

The system 1200 also includes a wireless communication hot spot 1256 with IMS integration. Devices can connect to an ISP 1258 using fixed broadband access. The ISP 1258 can also connect to the CN 1242 and the Internet 1235. The hot spot system 1256 can also connects form the Internet 1235 to the PSTN 1226 via a VoIP gateway 1260.

The system 1200 also illustrates a wireless WAN (wide area network) 1262 with IMS integration, in which a RAN (regional area network) 1264 is also shown in communication with the ISP 1258.

Figure 13:
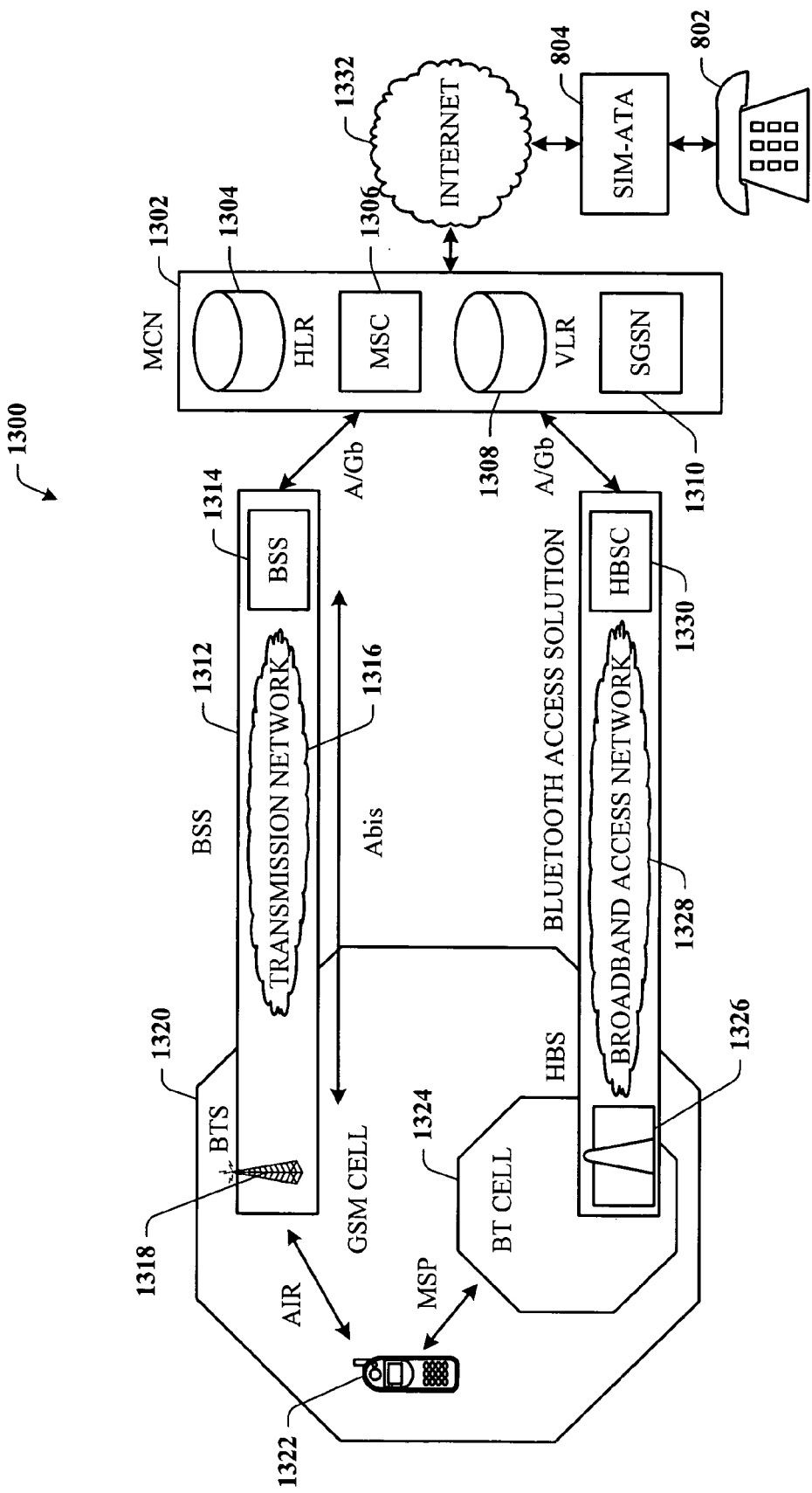
FIG. 13 illustrates a high-level block diagram of a personal coverage area communication system in accordance with an aspect of the subject invention.

Referring now to FIG. 13, there is illustrated a high-level block diagram of a personal coverage area (PCA) communication system 1300 in accordance with the subject invention. The PCA is a small short-range cell associated with the user. The system 1300 includes a mobile core network (MCN) 1302 that facilitates mobile communications for a wide variety of mobile devices. The MCN 1302 includes a Home Location Register (HLR) 1304, which is a database within a GSM network which stores all the subscriber data, and is an important element in the roaming process. The HLR 1304 is maintained by the user's cellular provider of record in order to provide a source of verification for the user's cellular account and profile information. The MCN 1302 also includes a mobile switching center (MSC) 1306, which is a switch that provides service and coordination between mobile users in a network and external networks. The MSC 1306 typically includes interfaces to a BSC (Base Station Controller), the HLR 1304, a VLR 1308, and other MSCs (not shown).

A VLR (visitor location register) 1308, which is a local database maintained by the cellular provider in whose territory the user is roaming. An SGSN (Serving GPRS Support Node) 1310 is included in the MCN 1302, which is a gateway between a RNC (Radio Network Controller) and the core network in a GPRS/UMTS network The MCN 1302 interfaces to a Base Station System (BSS) 1312 that comprises a base station controller (BSC) 1314 (that can control a number of BTS's), a transmission network 1316, and a base station transceiver (BTS) 1318. The MCN 1302 interfaces to the BSS 1312 via an A/Gb protocol stack. The BSS 1312 facilitates communication with a GSM cell 1320. A-bis is the communication interface over the network 1316 between the BSC 1314 and the GSM cell 1320. A cellular user in the GSM cell 1320 with a cellular device 1322 can access the MCN 1302 using air protocols over the BSS 1312.

Alternatively, the user can access the MCN 1302 using a short-range communication technology, such as Bluetooth (BT). When the device 1322 is within range of a BT cell 1324, communication can occur to a Home Base System (HBS) 1326, which is further in communication over a broadband network 1328 to an HBSC (Home Base Station Controller) 1330. The HBSC 1330 communicates with the MCN 1302 using the A/Gb protocol stack.

Figure 14:
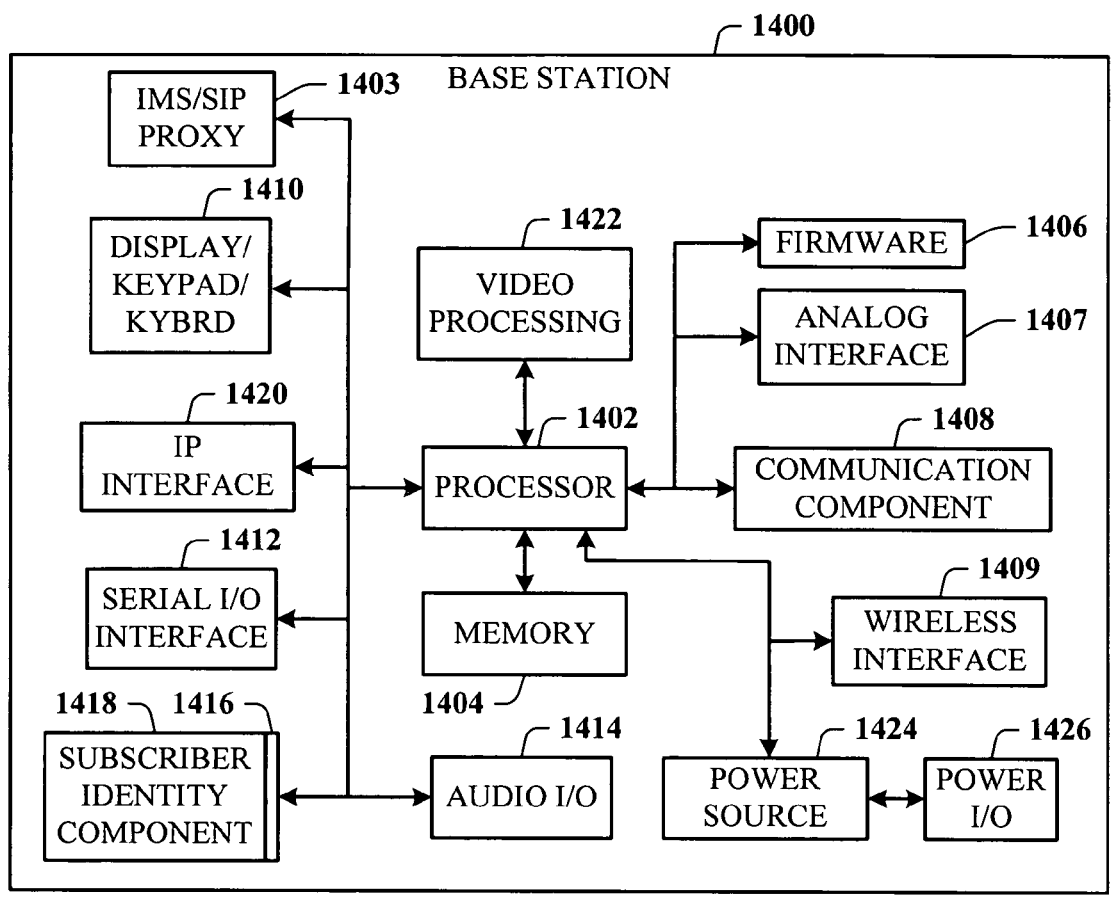
FIG. 14 illustrates a local base station operable in accordance with an aspect of the subject invention.

The user on the cell device 1322 can then make a call or receive a call that is facilitated in accordance with the subject invention by VoIP over the Internet 1332 to the home SIM-ATA device 804 and analog telephone 802. Referring now to FIG. 14, there is illustrated a local base station (LBS) 1400 operable in accordance with the subject invention. The LBS 1400 includes a processor 1402 for controlling and processing all onboard operations and functions. A memory 1404 interfaces to the processor 1402 for temporary storage of data and one or more applications stored in firmware 1406 and being executed by the processor 1402. An analog telephone interface 1407 accommodates connecting analog telephones and signals to the system 1400. The firmware 1406 also stores startup code for execution in initializing the LBS 1400. A communication component 1408 interfaces to the processor 1402 to facilitate wired/wireless communication with external systems. A second wireless interface 1409 is connected to the processor 1402 to accommodate wireless technologies not facilitated by the communication component 1408.

The LBS 1400 includes a display/keypad/keyboard component 1410 for displaying text and graphics related to telephony functions, for example, a Caller ID function and a setup function, and for user input. The component 1410 can also accommodate the presentation of multimedia content. A serial I/O interface 1412 is provided in communication with the processor 1402 to facilitate serial communication (e.g., USB, and/or IEEE 1394) via a hardwire connection. This supports updating and troubleshooting the LBS 1400, for example. Audio capabilities are provided with an audio I/O component 1414, which can include a speaker for the output of audio signals related to, for example, recorded data or telephony voice data, and a microphone for inputting voice signals for recording and/or telephone conversations.

The LBS 1400 includes a slot interface 1416 for accommodating the SIC in the form factor of a card 1418, and interfacing the SIC card 1418 with the processor 1402. However, it is to be appreciated that the SIC can be manufactured into the LBS 1400, and updates made by downloading data thereto. This applies to both the home and corporate embodiments described herein.

The LBS 1400 includes an IP interface 1420 for accommodating IP traffic from an IP network, for example, the Internet, corporate intranet, home network, person area network, etc., via an ISP or cable provider. Thus, VoIP traffic can be utilized by the LBS 1400, and IP-based multimedia content can be received in either an encoded or a decoded format. A video processing component 1422 can be provided for decoding encoded multimedia content. An IMS/SIP proxy service 1403 is also provided in communication with the processor 1403, the function of which has been described hereinabove. The LBS 1400 also includes a power source 1424 in the form of batteries and/or an AC power subsystem, which power source 1424 interfaces to an external power system or charging equipment (not shown) via a power I/O component 1426.

Aspects of the invention described above may be stored or distributed on computer-readable media, including magnetic and optically readable and removable computer discs, as well as distributed electronically over the Internet or over other networks (including wireless networks). Those skilled in the relevant art will recognize that portions or embodiments of the invention may reside in a fixed element of a communication network, while corresponding portions may reside on a mobile communication device. Data structures and transmission of data particular to aspects of the invention are also encompassed within the scope of the invention.

Figure 15:
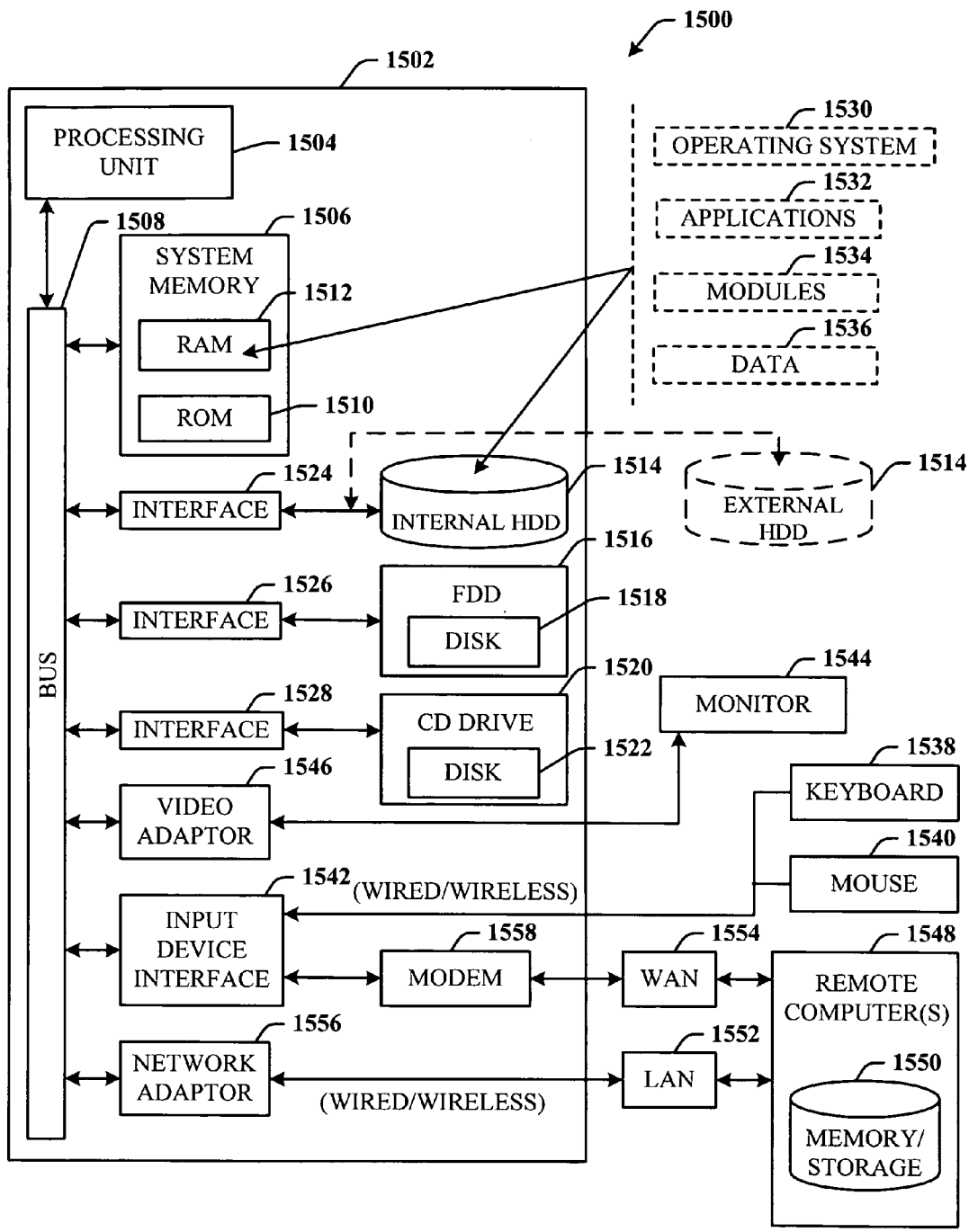
FIG. 15 illustrates an exemplary operating environment in accordance with an aspect of the subject invention.

Referring now to FIG. 15, there is illustrated a block diagram of a computer operable to execute the disclosed architecture. In order to provide additional context for various aspects of the subject invention, FIG. 15 and the following discussion are intended to provide a brief, general description of a suitable computing environment 1500 in which the various aspects of the subject invention may be implemented. While the invention has been described above in the general context of computer-executable instructions that may run on one or more computers, those skilled in the art will recognize that the invention also may be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like, each of which may be operatively coupled to one or more associated devices.

The illustrated aspects of the invention may also be practiced in distributed computing environments where certain tasks are performed by remote processing devices that are linked through a communications network. In a distributed computing environment, program modules may be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 15, there is illustrated an exemplary environment 1500 for implementing various aspects of the invention that includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 may be any of various commercially available processors. Dual microprocessors and other multi-processor architectures may also be employed as the processing unit 1504.

The system bus 1508 can be any of several types of bus structure that may further interconnect to a memory bus (with or without a memory controller), a peripheral bus, and a local bus using any of a variety of commercially available bus architectures. The system memory 1506 includes read only memory (ROM) 1510 and random access memory (RAM) 1512. A basic input/output system (BIOS) is stored in a non-volatile memory 1510 such as ROM, EPROM, EEPROM, which BIOS contains the basic routines that help to transfer information between elements within the computer 1502, such as during start-up. The RAM 1512 can also include a high-speed RAM such as static RAM for caching data.

The computer 1502 further includes an internal hard disk drive (HDD) 1514 (e.g., EIDE, SATA), which internal hard disk drive 1514 may also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the subject invention.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is appreciated that the subject invention can be implemented with various commercially available operating systems or combinations of operating systems.

A user can enter commands and information into the computer 1502 through one or more wired/wireless input devices, e.g., a keyboard 1538 and a pointing device, such as a mouse 1540. Other input devices (not shown) may include a microphone, an IR remote control, a joystick, a game pad, a stylus pen, touch screen, or the like. These and other input devices are often connected to the processing unit 1504 through an input device interface 1542 that is coupled to the system bus 1508, but may be connected by other interfaces, such as a parallel port, an IEEE 1394 serial port, a game port, a USB port, an IR interface, etc.

A monitor 1544 or other type of display device is also connected to the system bus 1508 via an interface, such as a video adapter 1546. In addition to the monitor 1544, a computer typically includes other peripheral output devices (not shown), such as speakers, printers etc.

The computer 1502 may operate in a networked environment using logical connections via wired and/or wireless communications to one or more remote computers, such as a remote computer(s) 1548. The remote computer(s) 1548 may be a workstation, a server computer, a router, a personal computer, portable computer, microprocessor-based entertainment appliance, a peer device or other common network node, and typically includes many or all of the elements described relative to the computer 1502, although, for purposes of brevity, only a memory storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1502 is connected to the local network 1552 through a wired and/or wireless communication network interface or adapter 1556. The adaptor 1556 may facilitate wired or wireless communication to the LAN 1552, which may also include a wireless access point disposed thereon for communicating with the wireless adaptor 1556. When used in a WAN networking environment, the computer 1502 can include a modem 1558, or is connected to a communications server on the WAN, or has other means for establishing communications over the WAN 1554, such as by way of the Internet. The modem 1558, which may be internal or external and a wired or wireless device, is connected to the system bus 1508 via the serial port interface 1542. In a networked environment, program modules depicted relative to the computer 1502, or portions thereof, may be stored in the remote memory/storage device 1550. It will be appreciated that the network connections shown are exemplary and other means of establishing a communications link between the computers may be used.

The computer 1502 is operable to communicate with any wireless devices or entities operably disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication may be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11a) or 54 Mbps (802.11b) data rate or with products that contain both bands (dual band), so the networks can provide real-world performance similar to the basic 10BaseT wired Ethernet networks used in many offices.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates activating and/or programming of a subscriber identity module (SIM) enabled analog telephone adapter (ATA) device, comprising:
    an input/output component that communicates data via a network;
    a programming component that programs a SIM-ATA module based at least in part on data received via the network, the SIM-ATA module comprises a SIM card employable in an ATA device, the programming component writes the data received via the network to the SIM card;
    an activation component that facilitates activation of the SIM-ATA module via the network, the activation component configures the network to operate with the SIM-ATA module that includes the SIM card that retains the data programmed by the programming component; and
    a token transceiver component that receives a token from a cellular network, the token enables the programming component to program the SIM card.

2. The system of claim 1, the network is an Internet.

3. The system of claim 1, the network is a cellular network.

4. The system of claim 1, the token is obtained by the token transceiver component from a mobile communication device that receives the token from the cellular network.

5. The system of claim 1, the token is transmitted by the cellular network based at least in part on at least one of a subscriber's request, automatically when a mobile communication device has a concurrent connection to the network, or when the SIM-ATA module is coupled to the mobile communication device.

6. The system of claim 1, the token is received by the token transceiver component via a short range radio frequency (RF) signal.

7. The system of claim 1, the token has a limited validity period.

8. The system of claim 7, the limited validity period is determined based at least in part on at least one of a time stamp associated with the token or data included in the token related to an expiration time.

9. The system of claim 1, further comprising an interface component that communicates with the SIM-ATA module.

10. The system of claim 9, the interface component includes a plurality of SIM sockets coupled to a mobile communication device.

11. The system of claim 10, a SIM card of the mobile communication device is engaged with one of the SIM sockets and the SIM-ATA module is engaged with another one of the SIM sockets.

12. The system of claim 10, data is transferred from a memory of the SIM card of the mobile communication device to a memory of the SIM-ATA module.

13. The system of claim 9, the interface component is a SIM socket of a mobile communications device and a SIM card of the mobile communications device is replaced with the SIM-ATA module.

14. The system of claim 1, where software stored on the network programs the SIM-ATA module.

15. The system of claim 1, where software stored on the programming component programs the SIM-ATA module.

16. The system of claim 1, the data includes at least one of a token, a user name, a phone number, a unique identification number, an account number, an IP address, an equipment number, instructions, ring tones, skins, phonebook information, billing information, or address book information.

17. The system of claim 1, further comprising an information component that obtains additional data that is utilized for at least one of activation or programming.

18. A method of activating and/or programming of a SIM-enabled ATA device, comprising:
   downloading a token from a network;
   communicating the token to a SIM-enabled ATA device that includes a SIM-ATA module, the SIM-ATA module includes a SIM card configured to retain at least subscriber data;
   programming the SIM card with subscriber data obtained from the network upon receipt of the token from the mobile device; and
   activating the SIM-enabled ATA device via transmission of the token to the network from the SIM-enabled ATA device, the network employs the token to authenticate the SIM-enabled ATA device and registers the subscriber data retained by the SIM card to enable operation of the SIM-enabled ATA device on the network.

19. The method of claim 18, further comprising determining whether the token is expired.

20. The method of claim 19, further comprising preventing activation if the token has expired.

21. The method of claim 19, further comprising activating the SIM-enabled ATA device if the token is valid.

22. The method of claim 18, the token is transmitted to the SIM-enabled ATA device via a short range RF technique.

23. A system that facilitates activating and/or programming of a SIM-enabled ATA device, comprising:
   means for programming a SIM-ATA module that includes a SIM card, the means for programming comprise means for writing data to the SIM card, the data is obtained from a network;
   means for activating the SIM-ATA module, the means for activating include means for transmitting data retained on the SIM card to the network and means for configuring the network to operated with the SIM-enabled ATA device that employs the SIM-ATA module; and
   means for receiving a token from a cellular network, the token enables programming the SIM-enabled ATA module.

* * * * *